(12) United States Patent
Biasone et al.

(10) Patent No.: US 12,439,926 B2
(45) Date of Patent: Oct. 14, 2025

(54) COMPOSITION AND USES THEREOF IN AGRICULTURE

(71) Applicant: VALAGRO S.p.A., Atessa (IT)

(72) Inventors: Alessandro Biasone, Pescara (IT); Donata Di Tommaso, Mozzagrogna (IT); Giovanni Povero, Lanciano (IT); Vincenzo Lorito, Guglionesi (IT); Alberto Piaggesi, Francavilla Al Mare (IT)

(73) Assignee: Valagro S.P.A., Atessa (IT)

( * ) Notice: Subject to any disclaimer, the term of this patent is extended or adjusted under 35 U.S.C. 154(b) by 1138 days.

(21) Appl. No.: 17/260,803

(22) PCT Filed: Jul. 18, 2019

(86) PCT No.: PCT/IB2019/056153
§ 371 (c)(1),
(2) Date: Jan. 15, 2021

(87) PCT Pub. No.: WO2020/016825
PCT Pub. Date: Jan. 23, 2020

(65) Prior Publication Data
US 2021/0267217 A1 Sep. 2, 2021

(30) Foreign Application Priority Data
Jul. 18, 2018 (IT) .................. 102018000007292

(51) Int. Cl.
*A01N 65/03* (2009.01)
*A01N 63/20* (2020.01)
*A01N 65/08* (2009.01)
*A01N 65/44* (2009.01)
*B01D 11/02* (2006.01)

(52) U.S. Cl.
CPC ............ *A01N 65/03* (2013.01); *A01N 63/20* (2020.01); *A01N 65/08* (2013.01); *A01N 65/44* (2013.01); *B01D 11/0288* (2013.01); *B01D 11/0292* (2013.01)

(58) Field of Classification Search
None
See application file for complete search history.

(56) References Cited

U.S. PATENT DOCUMENTS

| 6,407,040 | B1 | 6/2002 | Nichols et al. |
| 10,202,313 | B2 * | 2/2019 | Akhund .................. C05G 3/00 |
| 2017/0226509 | A1 | 8/2017 | Perata et al. |
| 2017/0273312 | A1 | 9/2017 | Martinez-Barbreau |
| 2021/0267217 | A1 * | 9/2021 | Biasone ................. A01N 65/36 |
| 2021/0276927 | A1 * | 9/2021 | Di Muzio ............... C05B 19/00 |

FOREIGN PATENT DOCUMENTS

| EP | 1311159 | 5/2003 | |
| WO | 2017044774 A1 | 3/2017 | |
| WO | WO-2017050435 A1 * | 3/2017 | ............. A01N 65/03 |
| WO | 2018063828 A1 | 4/2018 | |
| WO | WO-0209513 A2 * | 9/2021 | ............. A01N 37/06 |

OTHER PUBLICATIONS

Farooq et al., Application of natural plant extracts improves the tolerance against combined terminal heat and drought stresses in bread wheat, Journal of Agronomy and Crop Science (2017), 203(6), 528-53 (Year: 2017).*
Garcia-Sanchez et al., Drought Tolerance of Tomato Plants, International Journal of Plant, Animal and Environmental Sciences (2016), 6(2), 15-22 (Year: 2016).*
Santaniello, et al., "Ascophyllum nodosum Seaweed Extract Alleviates Drought Stress in Arabidopsis by Affecting Photosynthetic Performance and Related Gene Expression", Frontiers in Plant Science, vol. 8, Article 1362, Aug. 3, 2017.

* cited by examiner

*Primary Examiner* — Alton N Pryor
(74) *Attorney, Agent, or Firm* — BakerHostetler; Toni-Junell Herbert

(57) ABSTRACT

The present invention refers to a composition based on algal and/or plant extracts and its use in agriculture to improve water use efficiency and/or water productivity in plants and/or agricultural water management thus resulting in increased yield of crop plants per unit water used.

17 Claims, 7 Drawing Sheets

A

B

COMPOSITION AND USES THEREOF IN AGRICULTURE

CROSS-REFERENCE TO RELATED APPLICATIONS

Figure 1:
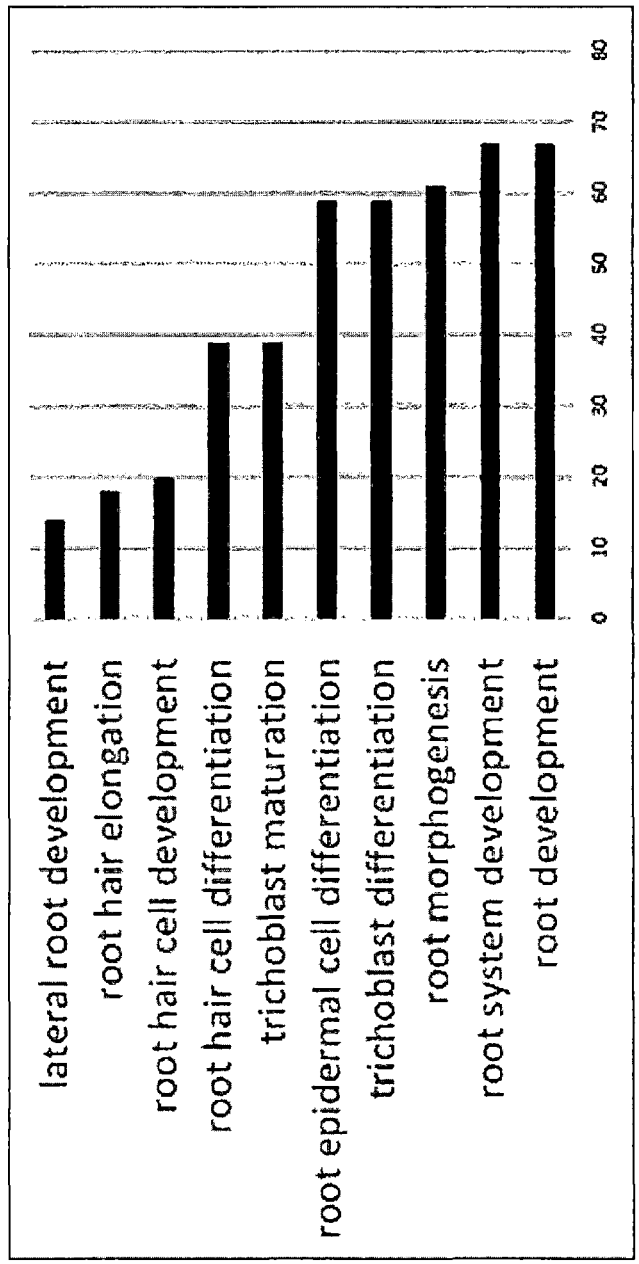

This application is a 371 national-stage application of International PCT Application No. PCT/IB2019/056153, filed Jul. 18, 2019, which claims priority to Italian Patent Application No. 102018000007292, filed Jul. 18, 2018, both of which are incorporated herein by reference in their entirety.

The present invention refers to a composition based on algal and/or plant extracts and uses thereof in agriculture to improve water use efficiency and/or water productivity in plants and/or agricultural water management thus resulting in increased yield of crop plants per unit water used.

BACKGROUND

Global population is expected to grow in the next years, and reach 9.1 billion by 2050 (FAO, 2011). This growth will need to be supported by an increase in fresh water availability by 55%. At the same time, water availability and water use patterns are expected to be modified in the next years, due to the modification of precipitation patterns and increase of global temperatures from 1 to 2.5° C. in the next 50 years (Morison et al., 2008).

In the above described scenario, the agricultural sector will be negatively affected, as the reduction in water availability will impact on plant productivity (Frontiers in Plant Science, Research Topic, 2018). In addition, an increasing competition between agriculture and other users is expected, with reductions in water quality as well as quantity in many regions (FAO, 2011).

Globally, agriculture accounts for 80-90% of all freshwater used by humans, and most of that is in crop production. It appears evident that making agriculture sustainable requires a major reduction in water use in many regions. In line with this, legislative restrictions are being applied on the use of water in agriculture (e.g. the 2003 Water Act in the UK and the target of a reduction of 20% in water use in agriculture by 2020 in China; Morison et al., 2008).

In this context, an important objective is to reduce water use by crops per unit yield, increase productivity per unit of water used and achieve "more crop per drop".

The percentage of water supplied to plants that is effectively taken up by the same and that is not lost to drainage, bare soil evaporation or interception is called "Water Use Efficiency" (WUE). Related to WUE, another parameter called "Water Productivity" (WP) represents the yield of the crop obtained by the usage of a given amount of water (ratio Y [kg]/water[m$^3$]).

Increasing WP means using less water to complete a particular task, or using the same amount of water, but producing more. Moreover, increased WP has been associated with improved food security and livelihoods (Cook et al., 2009b; Cai et al., 2011). Therefore, increased WP is an important element in efficient management of water and ecosystems for sustainable agriculture and food security (Desheemaeker et al., 2013).

WUE improvement is often equated with better drought tolerance or to the increase of crop yield under drought stress. However, this is not always the case. Indeed, it should be pointed out that WUE and WP can be improved even under non-water stressing conditions, such as i) under standard water management (adequate supply of water) or ii) under a certain water volume reduction, as long as it does not bring to a situation of drought.

Focusing the attention on the physiology of plants, water is essential for plant growth and tissue expansion, therefore for crop production. However, more than 90% of the water required by terrestrial plants is not used in any biochemical way but lost through transpiration.

In geographical areas where irrigations are utilized, the efficiency of supply and much better use of water applied should be improved. In other areas where rainfall represents the only source of water for crop growth, any improvements in production/yield through crop management, fertilization, soil improvement, biotic stress control will usually improve water productivity (Morison et al., 2008).

Several solutions have been developed to make more efficient the use of irrigation water, especially using soil additives as moisturizing agents and compositions based on moisturizing agents that are derived from polymers of natural or synthetic origin. Other solutions are based on the use of sponge-like materials, such as superabsorbent polymers or SAP, that are able to absorb at least 10 times their own weight of water, that is retained in the polymer structure in a way that cannot be released simply by squeezing the material.

Despite being effective, both solutions are based on materials that, in the majority of the cases, are not readily biodegradable, or not biodegradable at all, because they are usually derived from synthetic processes. For this reason, their use could result in soil contamination with unwanted substances, and this contamination could also be repeated several times during the crop cycle, thus resulting in accumulation of synthetic non-biodegradable chemicals in the soils.

Accordingly, there is still the need to find an alternative sustainable solution to these agronomical practices to improve water use efficiency and water productivity.

SUMMARY OF THE INVENTION

The present invention refers to a method for improving water use efficiency and/or water productivity in plants and/or agricultural water management comprising the following steps:
  (i) Having plants to be treated or in need thereof, and
  (ii) Feeding said plants, preferably through the soil, with an effective amount of a composition comprising at least one algal extract and/or at least one plant extract.

Preferably said plants to be treated or in need thereof are in non-drought condition (also known as mild water stress), that preferably corresponds:
  1) to values of leaf stomatal conductance level above 0.15 mol H$_2$O m$^{-2}$ s$^{-1}$, preferably measured through porometer/Licor gas-exchange system or any further instrument known to the expert for the purpose, and/or
  2) to values of soil water content below −60 kPa, preferably below −40 kPa, more preferably said value of soil water content ranges between −10 and −60 kPa, still more preferably between −10 kPa and −40 kPa, wherein said soil water content is preferably measured by using tensiometers or any further instrument know to the expert for the purpose.

Preferably said at least one plant extract is present in the composition at a concentration up to 60%, preferably at a concentration ranging between 5% and 50%, more preferably between 10% and 45%, still more preferably between 30% and 45%, still more preferably around 40-45% said concentration being w/w.

Preferably said at least one algal extract is present in the composition at a concentration up to 60%, preferably at a concentration ranging between 3% and 58%, more preferably between 5% and 45%, still more preferably between 20% and 45%, still more preferably around 27-30% said concentration being w/w.

According to a preferred embodiment, the composition comprises at least one algal extract at a concentration up to 40%, preferably up to 30% and at least one plant extract in a concentration up to 60%, preferably up to 45%.

According to a preferred embodiment, said algae comprises macroalgae and/or microalgae, preferably said macroalgae being a seaweed, more preferably red, brown or green seaweed, wherein said brown seaweed is preferably selected from: *Ascophyllum nodosum, Ecklonia maxima, Laminaria saccharina, Laminaria digitata, Fucus spiralis, Fucus serratus, F. vesiculosus, Macrocystis* spp., *Pelvetia canaliculata, Himantalia elongata, Undaria pinnatifida, Sargassum* spp, and combinations thereof; wherein said red seaweed is preferably selected from: *Kappaphycus* spp., *Chondrus* spp., *Palmaria* spp., *Gracilaria* spp., *Porphyra* spp., *Porphyridium* spp., *Mastocarpus* spp., *Polysiphonia* spp. and combinations thereof; wherein said green seaweed is preferably selected from: *Ulva* spp., *Caulerpa* spp., *Codium* spp., *Halimeda* spp, *Acetabularia* spp., *Cladophora* spp. and combinations thereof; wherein said microalgae is preferably selected from: *Spirulina, Scenedesmus, Nannochloropsis, Haematococcus, Chlorella, Phaeodactylum, Arthrospyra, Tetraselmis, Isochrysis, Synechocystis, Clamydomonas, Parietochloris, Desmodesmus, Neochloris, Dunaliella, Thalassiosira, Pavlova, Navicula, Chaetocerous,* and combinations thereof.

According to a preferred embodiment, said plant extract is selected from: beet, sugar cane, alfalfa, maize, brassica, halophytes, soya, wheat, yucca, quillaja, hop, coffee, citrus, olive, lupine, bean, pea, lentils, mushrooms, carrot, apple, tomato and combinations thereof; wherein said at least one plant is the whole plant or any part thereof, preferably said part thereof being selected from: leaves, roots, stems, fruits, flowers, seeds, seedlings, bark, berries, skins, and combinations thereof.

Preferably said plant to be treated or in need thereof is any monocotyledonous and/or dicotyledonous species, preferably a crop, more preferably selected from: fertigated orchards, preferably selected from: stone fruit, pome fruit, olive, citrus, grapes, small fruits and tree nut crops; preferably selected from tropical fruits; vegetables species preferably selected from: fruiting vegetables, leafy vegetables, tuber and bulbs forming species and ornamentals; and row/industrial crops preferably selected from: cereals, sugar, protein and oil crops, forage, fiber and biomass crops.

According to a preferred embodiment, the composition further comprises: a source of macro-micronutrients, preferably in a concentration ranging between 1% and 30%, preferably 15% and 25%, more preferably around 20-22% w/w, wherein said source of macro-micronutrients is preferably selected from: a nitrogen source, a potassium source, a manganese source, a zinc source, an iron source, a copper source and combinations thereof; and/or at least one metabolism stimulating substances, preferably a vitamin, preferably in a concentration ranging from 0.1% and 1%; and/or a plant biostimulant (PBS); and/or microorganisms, preferably selected from: bacteria, more preferably PGPR (Plant Growth-Promoting Rhizobacteria), yeasts, fungi, and mycorrhizae; and/or an agricultural compatible carrier; and/or a herbicide, nematicide or nematostatic agent, a fungicide, an insecticide; and/or a drying agent.

According to a preferred embodiment, the composition is formulated as solution, suspension, water-soluble concentrates, dispersable concentrates, emulsifiable concentrates, emulsions, suspensions, microemulsion, gel, microcapsules, granules, ultralow volume liquid, wetting powder, dustable powder, or for seed coating, spray and ready to use formulation.

Preferably, the composition is used to feed plants, preferably after being diluted in water, once or repeatedly throughout the plant cycle, preferably the crop cycle, wherein the feeding step is preferably through the soil and/or through the leaves.

According to a preferred embodiment, the method further comprising a step of monitoring the soil water content value and/or the leaf stomatal conductance value, said step of monitoring being performed before and after the feeding step. Preferably the feeding step, preferably through the soil, is performed when the water soil content and/or availability remains within an optimal or sub-optimal level for the crop development, and/or in conditions of reduced/limited irrigation water availability, as long as drought condition is not reached, preferably when the values of soil water content range between −10 and −40 kPa; and/or the leaf stomatal conductance value is above 0.15 mol $H_2O$ $m^{-2}$ $s^{-1}$.

According to a preferred embodiment, the extract from plants or from algae or from microalgae is prepared by using a process comprising the following step: providing a sample of algae and/or a sample of microalgae and/or a sample of plants; and contacting said sample(s) with an aqueous solution comprising an extraction agent.

SHORT DESCRIPTION OF FIGURES

FIG. 1 shows the list of GO (gene ontology/biological processes) groups (cut-off $p<0.01$) involved in root-development processes and up-regulated ≥5 fold by the tested compositions. Y axis: biological process description; X axis: number of up-regulated genes ("matched entities") for each biological process.

Figure 2:
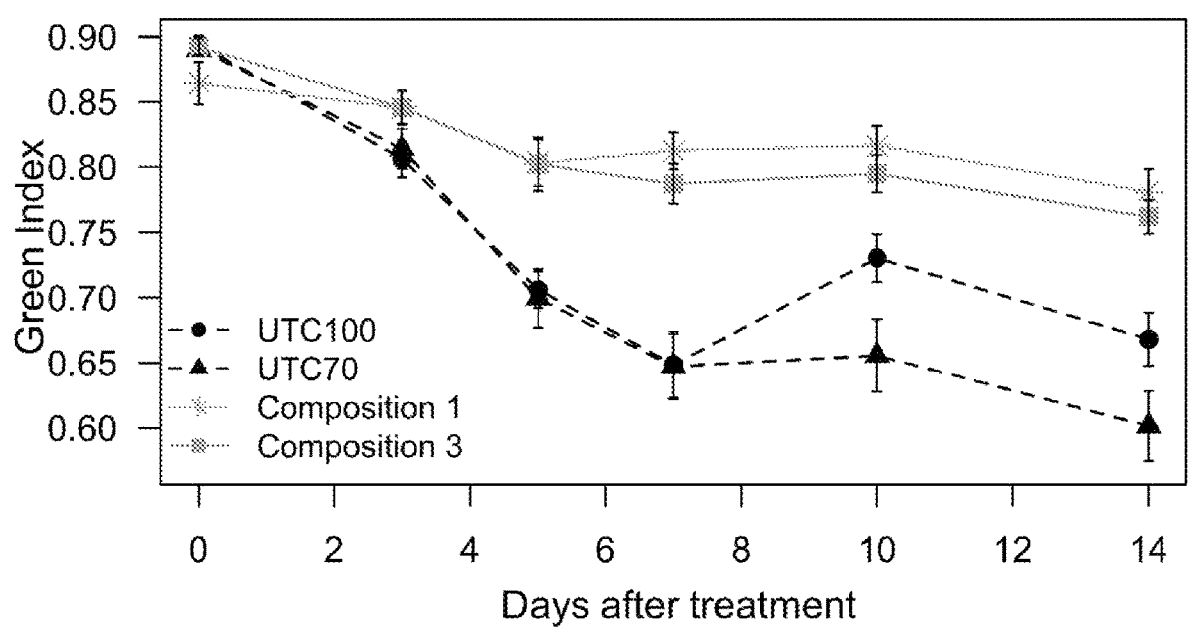

FIG. 2 shows the level of "Green Index" comparing: 1) Untreated Control, where plants were irrigated optimally, according to the standard protocol (UTC100); 2) Untreated Control, where plants were irrigated with a reduced water volume, corresponding to 70% (UTC70); 3) Experimental Conditions Tested Compositions, where tomato plants were treated with the tested compositions (3 applications at a rate of 20 L/ha. Timing: one application every 7-10 days) and irrigated with a water volume of 70% compared to the fully watered UTC100 thesis. Measurements were taken from "time 0" up to 14 days after treatment.

FIG. 3A shows the level of "Digital Biovolume" comparing: 1) Untreated Control, where plants were irrigated optimally, according to the standard protocol (UTC100); 2) Untreated Control, where plants were irrigated with a reduced water volume, corresponding to 70% (UTC70); 3) Experimental Conditions Tested Compositions, where tomato plants were treated with the tested compositions (3 applications at a rate of 20 L/ha. Timing: one application every 7-10 days) and irrigated with a water volume of 70% compared to the fully watered UTC100 thesis. Measurements were taken from time 0 up to 14 days after treatment.

FIG. 3B shows leaf area ($cm^2$) and fresh weight (g) measurements at the end of the experiment comparing: 1) Untreated Control where plants were irrigated optimally, according to the standard protocol (UTC W. 100%); 2) Untreated Control where plants were irrigated with a reduced water volume, corresponding to 70% (UTC W.

70%); 3) experimental condition W. 70%+tested composition where tomato plants were treated with the tested composition (3 applications at a rate of 20 L/ha. Timing: one application every 7-10 days) and irrigated with a water volume of 70% compared to the fully watered UTC W. 100% thesis.

Figure 4:
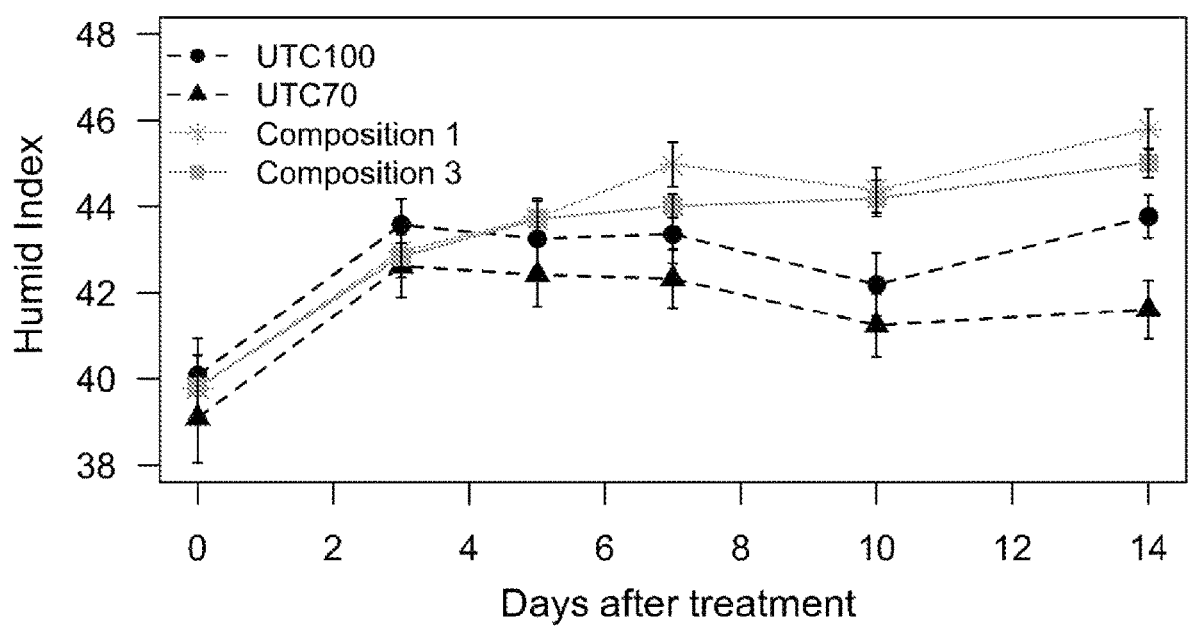

FIG. 4 shows water content measurement, expressed as "Humid Index", comparing: 1) Untreated Control, where plants were irrigated optimally, according to the standard protocol (UTC100); 2) Untreated Control, where plants were irrigated with a reduced water volume, corresponding to 70% (UTC70); 3) Experimental Conditions Tested Compositions, where tomato plants were treated with the claimed compositions (3 applications at a rate of 20 L/ha. Timing: one application every 7-10 days) and irrigated with a water volume of 70% compared to the fully watered UTC100 thesis. Measurements were taken from time 0 up to 14 days after treatment.

Figure 5:
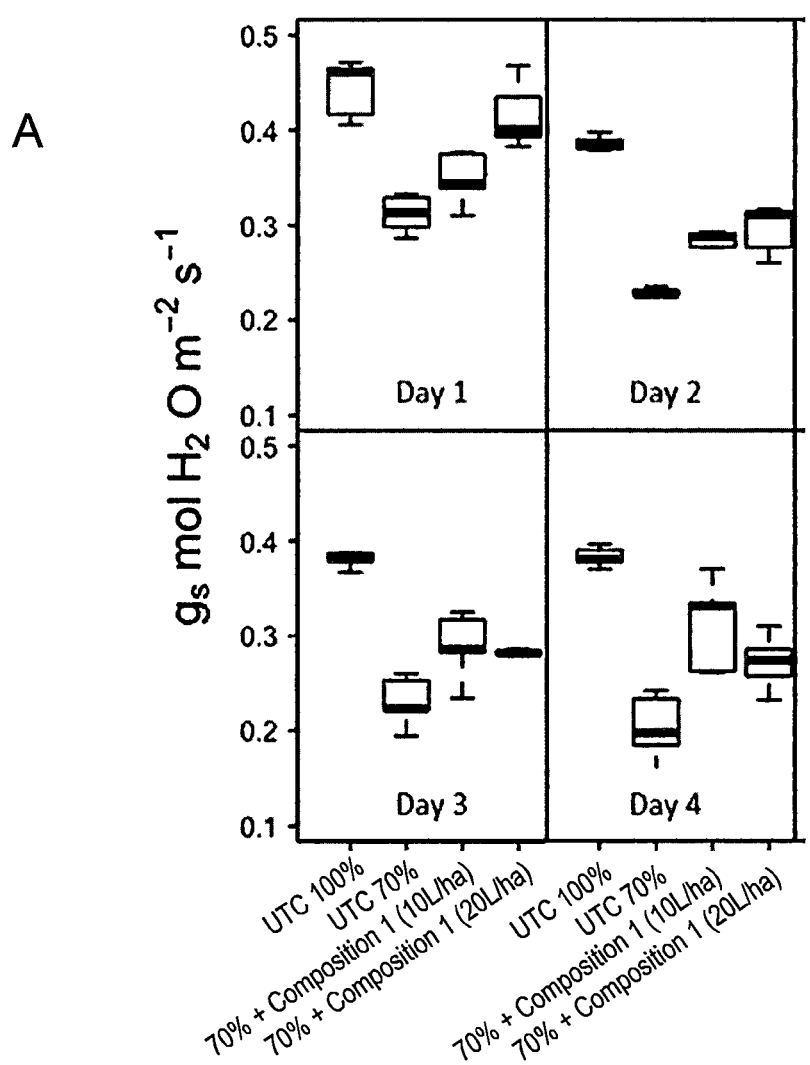
Figure 5:
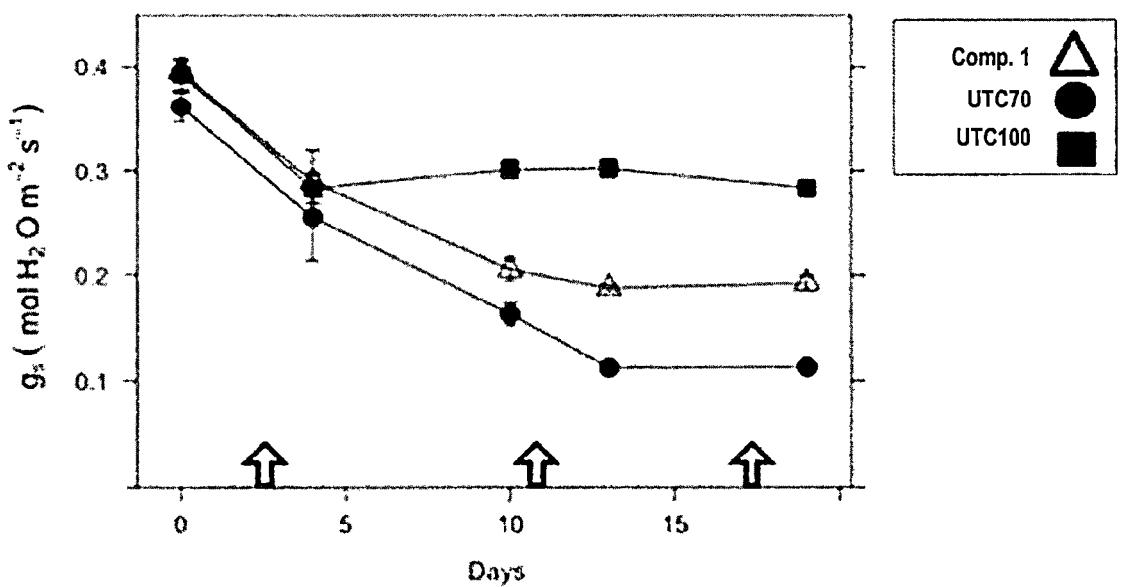

FIG. 5A shows stomatal conductance measurements on tomato plants after Day 1, Day 2, Day 3, Day 4 from the application of the composition, comparing: 1) Untreated Control, where plants were irrigated optimally, according to the standard protocol (UTC 100%); 2) Untreated Control, where plants were irrigated with a reduced water volume, corresponding to 70% (UTC 70%); 3) Experimental Conditions 70% Tested Compositions (10 L/ha), where tomato plants were treated with the tested compositions at a rate of 10 L/ha and irrigated with a water volume of 70% compared to the fully watered UTC 100% thesis; 4) Experimental Conditions 70% Tested Compositions (20 L/ha), where tomato plants were treated with the tested compositions at a rate of 20 L/ha and irrigated with a water volume of 70% compared to the fully watered UTC 100% thesis.

FIG. 5B shows stomatal conductance measurements on grape plants comparing: 1) Untreated Control, where plants were irrigated optimally, according to the standard protocol (UTC100); 2) Untreated Control, where plants were irrigated with a reduced water volume, corresponding to 70% (UTC70); 3) Experimental Conditions Tested Compositions, where grape plants were treated with the tested compositions (3 applications at a rate of 10 L/ha. Timing: one application every 7-10 days; each treatment is identified by the arrows in the graph) and irrigated with a water volume of 70% compared to the fully watered UTC100 thesis. Measurements were taken from time 0 up to 19 days after treatment.

Figure 6:
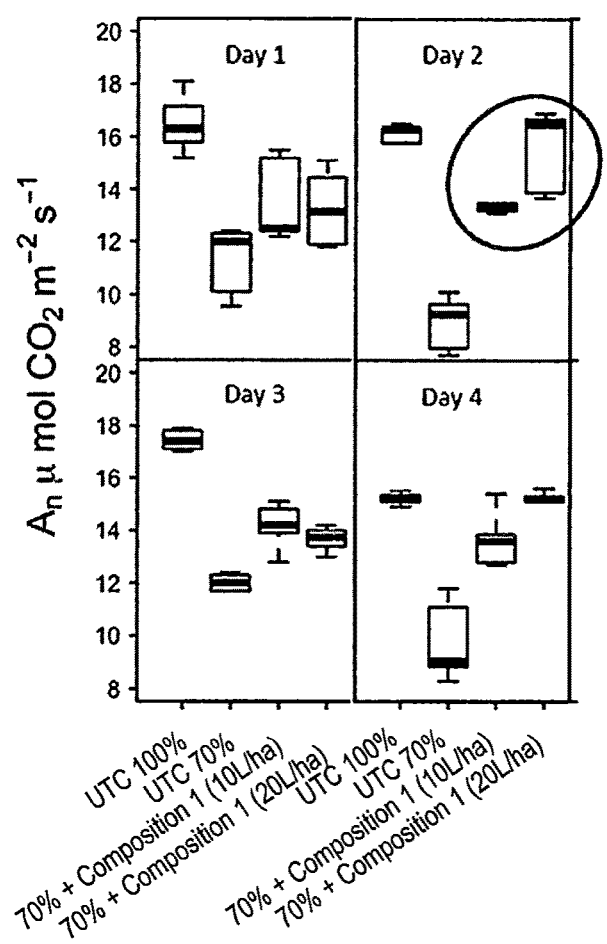
Figure 6:
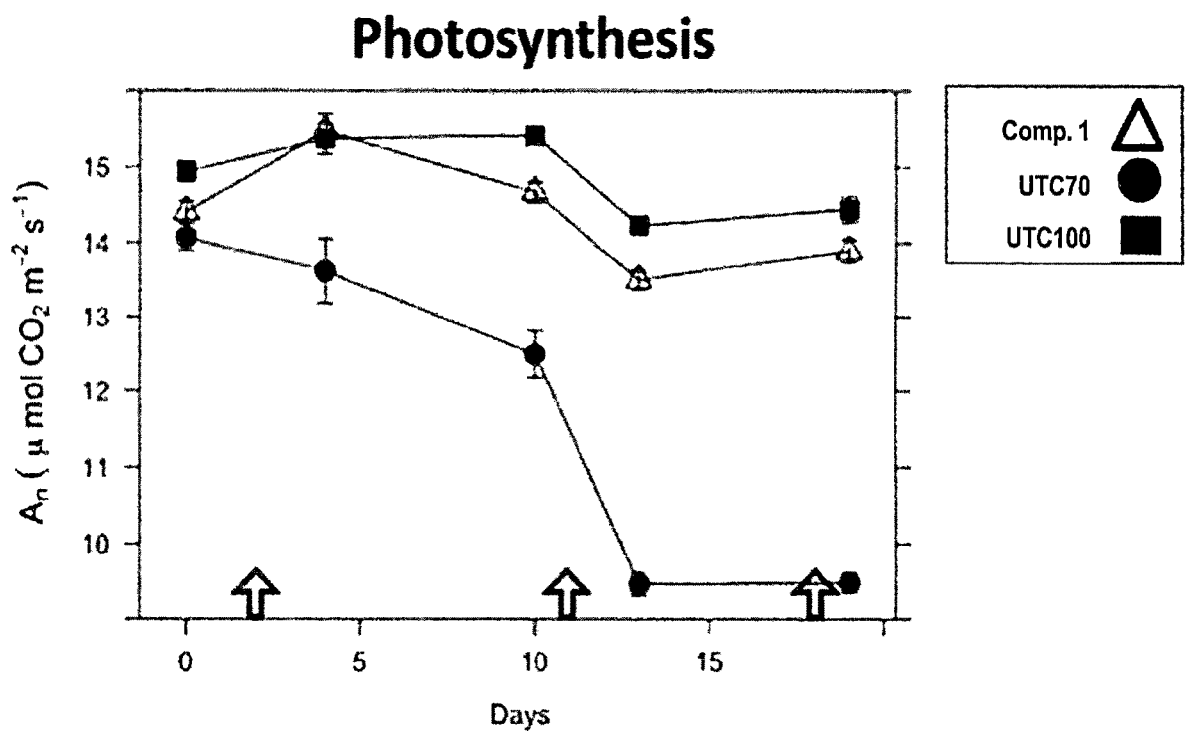

FIG. 6A shows net assimilation rate (in other words "net photosynthesis") measurements on tomato plants after Day 1, Day 2, Day 3, Day 4 from the application of the composition, comparing: 1) Untreated Control, where plants were irrigated optimally, according to the standard protocol (UTC 100%); 2) Untreated Control, where plants were irrigated with a reduced water volume, corresponding to 70% (UTC 70%); 3) Experimental Conditions 70% Tested Compositions (10 L/ha), where tomato plants were treated with the tested compositions at a rate of 10 L/ha and irrigated with a water volume of 70% compared to the fully watered UTC 100% thesis; 4) Experimental Conditions 70% Tested Compositions (20 L/ha), where tomato plants were treated with the tested compositions at a rate of 20 L/ha and irrigated with a water volume of 70% compared to the fully watered UTC 100% thesis.

FIG. 6B shows net assimilation rate measurements on grape plants comparing: 1) Untreated Control, where plants were irrigated optimally, according to the standard protocol (UTC100); 2) Untreated Control, where plants were irrigated with a reduced water volume, corresponding to 70% (UTC70); 3) Experimental Conditions Tested Compositions, where grape plants were treated with the claimed compositions (3 applications at a rate of 10 L/ha. Timing: one application every 7-10 days; each treatment is identified by the arrows in the graph) and irrigated with a water volume of 70% compared to the fully watered UTC100 thesis. Measurements were taken from time 0 up to 19 days after treatment.

Figure 7:
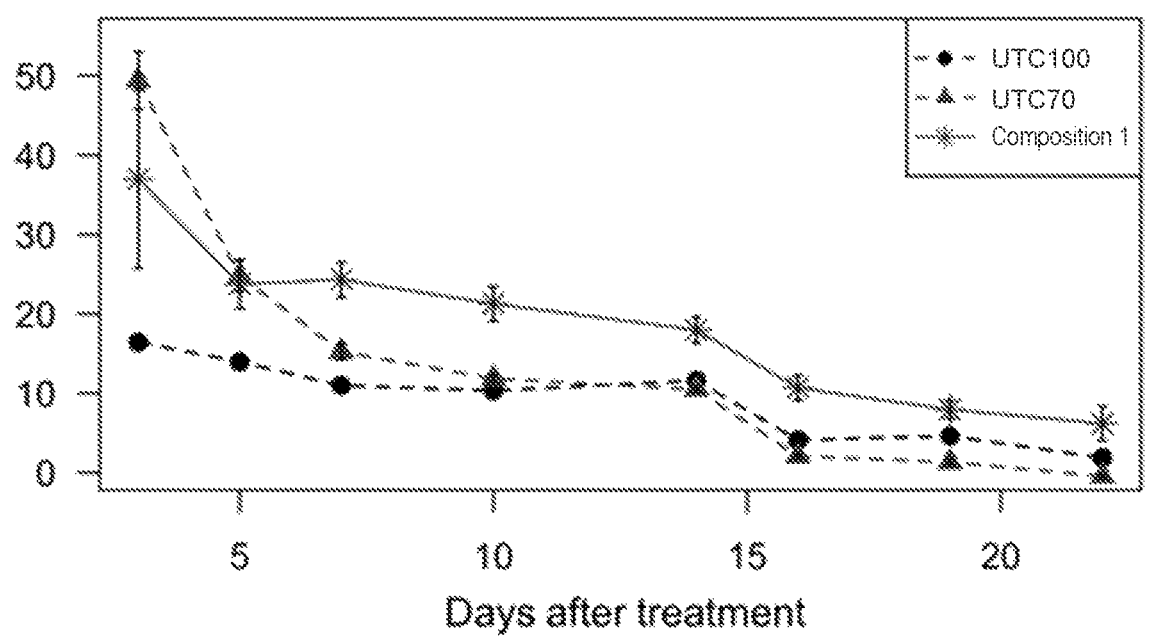

FIG. 7 shows water productivity (biovolume/water utilized) measurement comparing: 1) Untreated Control, where plants were irrigated optimally, according to the standard protocol (UTC100); 2) Untreated Control, where plants were irrigated with a reduced water volume, corresponding to 70% (UTC70); 3) Experimental Conditions Tested Compositions, where tomato plants were treated with the tested compositions (3 applications at a rate of 20 L/ha. Timing: one application every 7-10 days) and irrigated with a water volume of 70% compared to the fully watered UTC100 thesis. Measurements were taken from Time 0 up to 24 days after treatment.

DETAILED DESCRIPTION OF THE INVENTION

A first aspect of the present invention refers to a method for improving water use efficiency and/or water productivity in plants and/or agricultural water management, said method comprising at least one phase of feeding plants with an effective amount of a composition comprising at least one algal extract and/or at least one plant extract.

Therefore, the present invention refers to a method for improving water use efficiency and/or water productivity in plants and/or agricultural water management comprising the following steps: (i) having a plant to be treated or in need thereof, and (ii) feeding (treating) said plant with an effective amount of a composition comprising at least one algal extract and/or at least one plant extract. The treating step may be performed one or more times and—basically—it involves feeding or applying to the plant of step (i) an effective amount of a composition comprising at least one algal extract and/or at least one plant extract.

In other words, in order to improve water use efficiency and/or water productivity in plants and/or agricultural water management, plants to be treated are fed with an effective amount of a composition characterized by a source of carbon comprising (based on) plant and/or algal extract(s).

Alternatively, or in addition to the purposes mentioned above, the method here disclosed can be also useful to modulate plant physiology, so that plants treated with the composition as here disclosed require less irrigation water per unit of yield produced.

The plants to be treated or in need thereof are preferably cultivated (grown/seeded) in non-drought conditions (sometime also known as mild water stress), in other words in optimal/sub-optimal or mild reduction/limitation of irrigation water availability. As already mentioned, mild means when leaf stomatal conductance level of a plant is above 0.15 mol $H_2O$ $m^{-2}s^{-1}$, preferably measured through porometer/Licor gas-exchange system or any further instrument known to the expert for the purpose, and/or 2) when the value of soil water content ranges between −10 kPa and −60 kPa, preferably between −10 kPa and −40 kPa, wherein said soil water content is preferably measured by using tensiometers or any further instrument know to the expert for the purpose.

Therefore, the method here disclosed can be also useful to improve water efficient irrigation, preferably in hot and/or dry environments that are naturally prone to high evaporation rates.

As used herein, "unit of yield produced" means measured fresh or dry weight of biomass produced by plants per surface unit or per plant. It can refer either to the commercially valuable parts of the plant or to the whole plant biomass.

As used herein, "optimal/sub-optimal irrigation water availability" means optimal or nearly optimal irrigation water volume supplied to plants, avoiding both water excess and/or moderate/severe water scarcity, preferably calculated with dedicated equipment and/or according to farmer experience.

As used herein, "reduced/limited irrigation water availability" means reduction of irrigation water volume, preferably up to 40% compared to the common agricultural practice, as long as drought condition (according to the definition below) is not reached.

According to preferred embodiment of the invention, an algal meal and/or a juice and/or a suspension and/or an emulsion can be used as an alternative of or in combination with an extract from algae. According to a further preferred embodiment of the invention, any plant derived material and/or a plant meal and/or a juice and/or a suspension and/or an emulsion can be used as an alternative of or in combination with an extract from plants.

In this context, extract means any substance and/or product and/or by-product, preferably agro-industrial by-product, and/or any derivative obtained from processing and/or the extraction of said donor plants and/or algae and/or microalgae. Preferably said substance/product/by-product/derivative is selected from: extract, meal, pulp, molasses, juice, oil, waste flour, bran, residues and derivatives thereof.

As used herein, "water use efficiency" (WUE) means the percentage (%) of water supplied to the plant that is effectively taken up by the plant and that is not lost, for example by draining, bare soil evaporation, interception or transpiration. In other words, it means the ratio between effective water use and actual water withdrawal and it characterizes, in a specific process, how effective is the use of water from plants.

As used herein, "productivity" is a ratio between a unit of output and a unit of input. In particular, "water productivity" (WP) means the amount or value of product over volume or value of water depleted or diverted, in other words it means the yield of the plant obtained by the usage of a given amount of water (ratio Y [kg]/water[m$^3$]). The value of the product may be expressed in different terms, preferably biomass, grain, or money.

As used herein, "agricultural water management" means the use of water and irrigation scheduling to provide plants the amount of water they need to ensure adequate productivity, taking also into account the water eventually supplied to the crop by rainfall. Agricultural water management includes the management of water used in plant production, both rainfed and irrigated, livestock production and inland fisheries.

As used herein, "feeding a plant" means applying the composition according to the present disclosure preferably diluted in water—to the soil area explored by the plant roots or the canopy. The solution containing the composition according to the present disclosure can be distributed to plants/crops, preferably via drip irrigation systems or poured onto soil or injected to soil nearby the root area, it can also be distributed via pivot or other overhead irrigation systems. Alternatively, the composition can be applied on the leaves and/or on the seeds. According to the plants repeated applications are possible.

Preferably the dosage is from 5 to 20 liter per Ha, more preferably from 5 to 10 L/ha, still more preferably about 10 L/ha. Single or multiple applications are possible, preferably from 1 to 5, depending on the plant and agricultural practice.

As used herein, "drought" means moderate to severe water deficiency, water stress that has a negative impact on plants yield worldwide. Drought condition, that means moderate to severe water deficiency, may be evaluated by measuring different parameters. The most common measured parameters to define if plants live a drought condition are 1) leaf stomatal conductance level as defined above; and/or the values of soil water content, preferably measured by using tensiometers or any further instrument know to the expert for the purpose, wherein said value is below −40, preferably below −60 kPa. Preferably the value of soil water content ranges between −10 kPa and −60 kPa, more preferably between −10 kPa and −40 kPa.

In general, leaf stomatal conductance levels below 0.15 mol $H_2O$ m$^{-2}$s$^{-1}$ are indicative of a drought condition in plants. This parameter may be measured through porometer/Licor gas-exchange system or any further instrument known to the expert for the purpose.

However, as may be obvious for any person who is an expert in this field, drought condition depends upon several parameters, such as the kind of plant, the variety, the plant stage, the type of soil and other environmental parameters that have strong influence on the plant water demand, thus on the drought stress.

Considering that water resources are decreasing, and climate change is expected to increase the amount of dry land, the outlook for agriculture could be dramatic (Battisti and Naylor, 2009). The strategies to cope with water scarcity differ depending on the species and genotypes of the plants, as well as on the type of drought. Generally, plants respond to drought with a series of physiological mechanisms, which include stomatal closure, repression of cell growth and photosynthesis, leading to plant wilt, an overall reduction in plant biomass and yield. Furthermore, many changes at the cellular and molecular level occur, involving extensive increases in the expression levels of the genes that protect plants from stress damage (Shinozaki and Yamaguchi-Shinozaki, 2007).

As used herein, "non-drought" means the status of plants ranging from optimal water availability to mild water deficiency. This status can be measured taking as reference, for example, the values of leaf stomatal conductance level above 0.15 mol $H_2O$ m$^{-2}$s$^{-1}$, preferably measured through porometer/Licor gas-exchange system or any further instrument know to the expert for the purpose, and/or the values of soil water content, preferably measured by using tensiometers or any further instrument know to the expert for the purpose, range preferably from −10 kPa to −40 kPa. In any case, any skilled man in the art would recognize and identify, especially thanks to the instruments currently available and exemplified above, when the soil water content is reaching critical values for plants, in other words when plants are overcoming the "non-drought condition"—that is the range from optimal/normal water availability to mild water deficiency—and they are going towards drought.

As used herein, "Green Index" means the relative Green Area of each image calculated as the sum of frequencies of the histogram classes included in the hue range preferably from yellowish green to bluish green (hue angle preferably ranging from 80° to 180°).

As used herein, "Digital Biovolume" means the calculation of the areas of the plant in the three orthogonal images from the RGB chamber. Preferably, the value is calculated by applying the following formula but any formula for the purpose may be used too:

$$\Sigma\text{pixel sideview } 0° + \Sigma\text{pixel sideview } 90° + \log 10(\Sigma\text{pixel topview}/3)$$

As used herein, "Humid Index" means the weighted mean of the NIR intensity colour classes, obtained preferably using the Near Infra-Red chamber.

As used herein, "stomatal conductance" means the measure of water vapor exiting through the stomata of a leaf.

As used herein, "assimilation rate" (in other words net photosynthesis) means the amount of Carbon Dioxide $CO_2$ utilized for photosynthetic process in a precise moment.

The method here disclosed works on plants (therefore plants are the target) and, being based on natural products (algal and/or plant extracts/derivatives), it represents a novel, innovative and eco-friendly practice to improve water use efficiency and/or water productivity in plants and/or agricultural water management compared to the one currently available that are based instead on the use of chemicals potentially dangerous for the ecosystem. Indeed, the products currently available on the market for this purpose are mainly wetting agents that work on the soil and not on plants (therefore their target is the soil). Moreover, they are based on the use of chemicals, for example, polymer surfactants or alcohols that allow increasing the water holding capacity of the soil particles, water penetration and water distribution slowing the natural gravitational movement of water.

Because of the observed and here disclosed effects on (receiving) plants, the composition used in the method herewith disclosed can be eventually defined also a biostimulant composition.

As used herein, a "biostimulant" falls into the definition provided by to the European Biostimulant Industry Council (EBIC) according to which plant biostimulants foster plant growth and development throughout the plant life cycle from seed germination to plant maturity in a number of demonstrated ways, including rendering water use more efficient (EBIC, 2018).

A further aspect of the present invention refers to the composition used in the method here disclosed said composition comprising at least one algal extract and/or at least one plant extract or at least one plant derived material.

According to a preferred embodiment, said at least one plant extract/plant derived material is present in the composition at a concentration up to 60%, preferably at a concentration ranging between 5% and 50%, more preferably between 10% and 45%, still more preferably between 30% and 45%, still more preferably around 40-45% or 45-50%% said concentration being w/w.

In this context, the concentration is expressed as percentage (%) w/w that is the weight of the plant extract in g per 100 g of the composition.

According to a further preferred embodiment of the invention, said at least one algal extract is present in the composition at a concentration up to 60%, preferably at a concentration ranging between 3% and 58%, more preferably between 5% and 45%, still more preferably between 20% and 45%, still more preferably around 27-30% said concentration being w/w.

According to a further preferred embodiment of the invention, the composition comprises at least one algal extract at a concentration up to 40%, preferably up to 30% and at least one plant extract (plant derived material) in a concentration up to 60% preferably up to 45-50%.

As used herein, "algae" refer to a functional group of organisms that carry out oxygenic photosynthesis and are not embryophytes. They include both bacterial (cyanobacteria) and/or eukaryotic organisms. The term encompasses organisms that are photoautotrophic, heterotrophic, or mixotrophic, and are typically found in freshwater and marine systems. The term algae include macroalgae and/or microalgae.

Preferably, said macroalgae are seaweed, preferably red, brown or green, wherein said brown seaweed is selected from: *Ascophyllum nodosum, Ecklonia maxima, Laminaria saccharina, Laminaria digitata, Fucus spiralis, Fucus serratus, F. vesiculosus, Macrocystis* spp., *Pelvetia canaliculata, Himantalia elongata, Undaria pinnatifida, Sargassum* spp, and combinations thereof; wherein said red seaweed is selected from: *Kappaphycus* spp., *Chondrus* spp., *Palmaria* spp., *Gracilaria* spp., *Porphyra* spp., *Porphyridium* spp., *Mastocarpus* spp., *Polysiphonia* spp. and combinations thereof; wherein said green seaweed is selected from: *Ulva* spp., *Caulerpa* spp., *Codium* spp., *Halimeda* spp, *Acetabularia* spp., *Cladophora* spp and combinations thereof.

*Ascophyllum nodosum* is particularly preferred for the purposes of the present invention. As used herein, "microalgae" refer to any microscopic algae that are unicellular and simple multi-cellular microorganisms, including both prokaryotic microalgae, preferably, cyanobacteria (Chloroxybacteria), and eukaryotic microalgae, preferably green algae (Chlorophyta), red algae (Rhodophyta), or diatoms (Bacillariophyta). Preferably said microalgae are selected from: *Spirulina, Scenedesmus, Nannochloropsis, Haematococcus, Chlorella, Phaeodactylum, Arthrospyra, Tetraselmis, Isochrysis, Synechocystis, Clamydomonas, Parietochloris, Desmodesmus, Neochloris, Dunaliella, Thalassiosira, Pavlova, Navicula, Chaetocerous*, and combinations thereof.

As used herein, "plant" means any one of the vast number of organisms within the biological kingdom Plantae. Conventionally the term plant implies a taxon with characteristics of multicellularity, cell structure with walls containing cellulose, and organisms capable of photosynthesis. Modern classification schemes are driven by somewhat rigid categorizations inherent in DNA and common ancestry. Preferably, they include monocotyledonous and dicotyledonous species including trees, forbs, shrubs, grasses, vines, ferns, mosses and crop plants, preferably vegetables, orchards and row/industrial crops.

In this context, plants are used as source (starting material) of the extract/derivatives, in other words the plants from which extracts (or derivatives/alternatives) are derived/obtained and in this case, they are also defined "donor plants".

Plants are also used as the target of the method/applications here disclosed, in other words the plants to be treated or in need thereof, and in this case, plants are also defined "receiving plants".

Preferably, the "donor plant" is selected from: several types of beet, sugar cane, alfalfa, maize, brassica, halophytes, soya, wheat, yucca, quillaja, hop, coffee, citrus, olive, lupine, bean, pea, lentils, mushrooms, carrot, apple, tomato, and combinations thereof.

For the purpose of the present invention, the whole plant or any part thereof may be used. Preferably, said part is selected from: leaves, roots, stems, fruits, flowers, seeds, seedlings, bark, berries, skins, and combinations thereof.

According to a preferred embodiment of the invention, said plant to be treated—the "receiving plant"—is any monocotyledonous and dicotyledonous species, preferably a crop, including also genetically modified and/or edited crops, selected from: orchards, preferably selected from: stone fruit, pome fruit, olive, citrus, grapes, small fruits and tree nut crops; selected from tropical fruits; vegetables species, preferably selected from: fruiting vegetables, leafy vegetables, tuber and bulbs forming species and ornamentals; row crops, preferably selected from: cereals, sugar, protein and oil crops, forage, fiber and biomass crops and combinations thereof.

For the purpose of the present invention, the whole plant or any part thereof may be treated. Preferably, the receiving plant is treated as seed, plant grown in protected environment as well as in open field, adult plant in a vegetative and/or reproductive stage, tree and perennial species of any age.

Preferably said plants/algae/microalgae processing/extraction is made by using solvents, acids, bases, enzymes or mechanical means eventually in any combination. Preferably said processing/extraction is made as disclosed in more detail below.

Preferably, the extracts are prepared from plants, from algae, or from microalgae by using a similar process (extraction process). More preferably, said extraction process comprises the following steps:
(i) Providing a sample of algae and/or a sample of microalgae and/or a sample of plants according to the detailed disclosure reported above; and
(ii) Contacting said sample(s) with an aqueous solution comprising an extraction agent, in other words an extraction solution having aqueous base (extraction/processing step).

As used herein, the extraction agent can be a base and/or an acid and/or an enzyme. These kind of extraction agents can be used in any combination or singly.

For the purpose of the present invention, the base is preferably an inorganic base, more preferably selected from: NaOH, KOH, $Na_2CO_3$, $K_2CO_3$, $NH_3$, $NaHCO_3$, $KHCO_3$, salts thereof, and any combination thereof.

For the purpose of the present invention, the acid is preferably selected from: $H_2SO_4$, $HNO_3$, HCl, $H_3PO_4$, and various acids of organic nature preferably selected from: acetic acid, citric acid, formic acid, butyric acid and ascorbic acid, gluconic acid, and any combination thereof.

For the purpose of the present invention, the enzyme is preferably selected from: papain, trypsin, amylase, pepsin, bromelain and specific enzymes that degrade organic polymers present in the algae, preferably alginases, and any combination thereof.

The selection of the extracting agent to be used for the process depends upon the kind of algae/microalgae/plant to be extracted and/or the molecules and/or components to extract from them.

Preferably, the temperature of the extraction step (step ii) ranges between −20 and 120° C., more preferably between 20 and 100° C.

Preferably, the extraction time ranges from a few minutes to several hours, more preferably between 30 minutes and 18 hours.

Preferably, the extraction step is realized at atmospheric pressure or at a pressure up to 10 Bar, more preferably at a pressure ranging from 1 to 8 Bar.

The extraction step may be followed by a further step of separating/removing the non-solubilized and/or non-extracted component when it is desirable using only the extract in the formulation of the biostimulant. The removing/separating step is preferably performed by decantation, filtration or centrifugation.

Alternatively, a suspension comprising both the extracted component and the non-extracted component can be used.

According to a preferred embodiment of the invention, the composition further comprises humic and/or fulvic acids and salts thereof. Preferably said humic and/or fulvic acids being present in a concentration ranging from 5% to 30% w/w.

According to a preferred embodiment of the invention, the composition further comprises a source of macro-micronutrients, preferably in a concentration ranging between 1% and 30%, preferably 5% and 25%, more preferably around 7-15% w/w.

According to a preferred embodiment of the invention, said source of macro-micronutrients is selected from: a nitrogen source, a potassium source, a phosphorus source, a manganese source, a zinc source, an iron source, a copper source, a boron source, a molybdenum source, a calcium source, a magnesium source and combinations thereof.

Preferably said nitrogen source is selected from: ammonium phosphates, ammonium nitrate, ammonium sulfate, ammonium thiosulfate, potassium thiosulfate, ammonia, urea, nitric acid, potassium nitrate, magnesium nitrate, calcium nitrate, sodium nitrate, protein hydrolisates of animal origin, aminoacids, proteins, yeast lysate, manganese nitrate, zinc nitrate, slow release urea, preferably ureaformaldehyde, similar compounds and combinations thereof.

Preferably said nitrogen source is present in a concentration ranging between 3% and 15%, more preferably between 5% and 12%, still more preferably around 8-10%.

Preferably said phosphorus source is selected from: Ammonium phosphates, potassium phosphates, phosphoric acid, sodium phosphates, calcium phosphate, magnesium phosphate, rock phosphate such as hydroxyapatite and fluoroapatite, phosphorous acid, sodium phosphite, potassium phosphite, calcium phosphite, magnesium phosphite, organic phosphorus compounds, such as inositol-phosphate, sodium glycerophosphate, ATP, and the like.

Preferably said phosphorus source is present in a concentration ranging between 0.1% and 10%, more preferably between 0.2% and 5%, still more preferably around 0.5%.

Preferably said potassium source is selected from: potassium acetate, potassium citrate, potassium sulfate, potassium thiosulfate potassium phosphate, potassium phosphite, potassium carbonate, potassium chloride, potassium hydroxide, potassium nitrate, mixed salts of magnesium and potassium, potassium sorbate, potassium ascorbate, organic forms of potassium, and combinations thereof.

Preferably said potassium source is present in a concentration ranging between 2.5% and 25%, more preferably between 4% and 12%, still more preferably around 4-8%.

Preferably said zinc source is selected from: zinc sulfate, zinc oxide, zinc hydroxide, zinc chloride, zinc carbonate, zinc phosphate, zinc nitrate, chelated zinc with EDTA, DTPA, HEDTA, EDDHA, EDDHSA, EDDHCA, EDDHMA, HBED, EDDS; complexed zinc with aminoacids, lignosulfonates, humic acid, fulvic acid, gluconic acid, heptagluconic acid, zinc citrate, zinc malate, zinc tartrate, zinc acetate, zinc lactate, zinc ascorbate and organic form of zinc.

Preferably said zinc source is present in a concentration ranging between 0.5% and 3%, more preferably between 1% and 2%, still more preferably around 1.5%.

Preferably said manganese source is selected from: manganese sulfate, manganese oxide, manganese hydroxide, manganese chloride, manganese carbonate, manganese phosphate, manganese nitrate, chelated manganese with a chelate preferably selected from: EDTA, DTPA, HEDTA, EDDHA, EDDHSA, EDDHCA, EDDHMA, HBED, EDDS IDHA, HJB, NTA, HIDS, IDS, GLDA, HEIDA, PDA, EDDM, and MGDA; complexed manganese with aminoacids, lignosulfonates, humic acid, fulvic acid, gluconic acid, heptagluconic acid, manganese citrate, manganese malate, manganese tartrate, manganese acetate, manganese lactate, manganese ascorbate and organic form of manganese.

Preferably said manganese source is present in a concentration ranging between 0.5% and 3%, more preferably between 1 and 2%, still more preferably around 1.5%.

Preferably, iron source is selected from: iron sulfate, iron oxide, iron hydroxide, iron chloride, iron carbonate, iron phosphate, iron nitrate, chelated iron preferably with a chelate selected from: EDTA, DTPA, HEDTA, EDDHA, EDDHSA, EDDHCA, EDDHMA, HBED, EDDS IDHA, HJB, NTA, HIDS, IDS, GLDA, HEIDA, PDA, EDDM, and MGDA; complexed iron with aminoacids, lignosulfonates, humic acid, fulvic acid, gluconic acid, heptagluconic acid, iron citrate, iron malate, iron tartrate, iron acetate, iron lactate, iron ascorbate and organic form of iron.

Preferably said iron source is present in a concentration ranging between 0.1% and 10%, more preferably between 0.2% and 9%, still more preferably around 0.5%.

Preferably said copper source is selected from: copper sulfate, copper oxide, copper hydroxide, copper chloride, copper carbonate, copper phosphate, copper nitrate, copper chelated with a chelate preferably selected from: EDTA, DTPA, HEDTA, EDDHA, EDDHSA, EDDHCA, EDDHMA, HBED, EDDS IDHA, HJB, NTA, HIDS, IDS, GLDA, HEIDA, PDA, EDDM, and MGDA; complexed copper with aminoacids, lignosulfonates, humic acid, fulvic acid, gluconic acid, heptagluconic acid, copper citrate, copper malate, copper tartrate, copper acetate, copper lactate, copper ascorbate and organic form of copper.

Preferably, said copper source is present in a concentration ranging between 0.1% and 10%, more preferably between 0.2% and 9%, still more preferably around 0.5%.

Preferably, said boron source is selected from: boric acid, sodium octaborate, boron complexed with hydroxyl-bearing amines, such as ethanolamines, and mineral forms of boron.

Preferably said boron source is present in a concentration ranging between 0.1% and 2%, more preferably between 0.2% and 2%, still more preferably around 0.5%.

Preferably, said molybdenum source is selected from: sodium molybdate, ammonium molybdate, potassium molybdate, and mineral forms of molybdenum.

Preferably said molybdenum source is present in a concentration ranging between 0.01% and 0.1%, more preferably between 0.02% and 0.05%, still more preferably around 0.03%.

According to a preferred embodiment, said at least one plant extract/plant derived material is present in the composition in a concentration up to 60%, preferably in a concentration ranging between 5% and 50%, more preferably between 10% and 45%, still more preferably between 30% and 45%, still more preferably around 40-45%; and/or said at least one algal extract is present in the composition in a concentration up to 60%, preferably in a concentration ranging between 3% and 58%, preferably between 5% and 45%, more preferably between 20% and 45%, still more preferably around 25-30%; and/or said source of macro-micronutrients is present in a concentration ranging between 1% and 30%, preferably 15% and 25%, more preferably around 18-22% said concentration (%) being w/w.

According to a further embodiment of the invention, the composition further comprises at least one preservative, preferably present in a concentration ranging from 0.05% to 2%, preferably around 1%, said concentration being w/w.

According to a further embodiment of the invention, the composition further comprises at least one metabolism stimulating substances, preferably vitamins, preferably in a concentration ranging from 0.1% and 1%. Preferably said vitamin is selected from: vitamin B1, B2, B3, B5, B6, B9, B12, E, A, D, C, PP, H, K1, K2, K 3 and combinations thereof.

According to a preferred embodiment of the invention, the composition comprises at least one further ingredient preferably selected from: proteins, protein hydrolisates, yeast lysate, yeast broth, peptides, oligopeptides, peptidoglycans, low-molecular weight peptides, synthetic and natural occurring aminoacids; molasses, polysaccharides, lypopolysaccharides, monosaccharides, disaccharides, oligosaccharides, sulfated oligosaccharides, exopolysaccharides, chitosan, stress protecting molecules, preferably selected from: betaines, mannitol, and other polyols with similar effects, hormones, hormone-like compounds, preferably selected from: melatonin, auxins, auxin-like compounds, cytokinins, cytokinin-like compounds, gibberellins, gibberellin-like compounds, abscisic acid, jasmonates, hormones precursors like polyamines spermine, spermidine, putrescine, and combinations thereof.

Other molecules may be advantageously added to the composition for the herewith disclosed purposes preferably these molecules being selected from: nucleic acids, uronic acids and polymers thereof, glucuronic acids and polymers thereof, small organic acids, preferably oxalic and succinic acids. Preferably, said small molecules may be a synthetic and/or naturally derived nucleic acid molecules containing multiple nucleotides, preferably being defined an oligonucleotide when the molecule is 18-25 nucleotides in length and polynucleotides when the molecule is 26 or more nucleotides. Preferably said oligonucleotides or polynucleotides or a mixture of both, include RNA or DNA or RNA/DNA hybrids or chemically modified oligonucleotides or polynucleotides or a mixture thereof.

According to a preferred embodiment of the invention, the composition further comprises a plant biostimulant (PBS) and/or a carrier, preferably an agriculturally compatible carrier.

As used herein "agriculturally compatible carrier" refers to any synthetic or natural derived molecule able to deliver the product in an active form in the site of action, preferably said carrier is selected from: surfactants, thickeners, suspension agents, wetting agents, and combinations thereof.

As used herein, surfactant means any molecule able to modify the surface tension of the water and allowing the product to impact a wider area of the leave and/or root and/or fruit, or any other part of the plant. Preferably, said surfactant is selected from: ionic, non-ionic, cationic surfactants, synthetic or naturally derived, preferably selected from: alkyl sulfonates, alkylarylsulfonates, ethoxylated alcohols, alkoxylated ethers, ethoxylated esters, alkylpolyglucosides, block copolymers, lignosulfonates, saponins, and combinations thereof. In general, said surfactants are used in a minimal concentration only to facilitate the formulation of the composition and/or the solubilisation of the ingredients. Preferably, they are used in a concentration ranging between 3% and 1%, more preferably around 2% said concentration being w/w. Preferably, said saponins derive from plants. More preferably, they are used in a concentration ranging from 0.1% and 1%, more preferably around 0.5% said concentration being w/w.

As used herein, "thickener" means any molecule able to modify the rheology of any given composition in the sense of improving the viscosity and stabilize it. Preferably, said thickener is selected from: natural and synthetic gums, lignosulfonates, molasses and the like.

As used herein, "suspension agent" means any molecule able to surround insoluble particles avoiding settlement and allowing the creation of a stable suspension of insoluble. Preferably, said suspension agent is selected from: natural and synthetic colloids, clays, and their derivatives and the like.

As used herein, "wetting agent" means any molecule able to avoid fast water evaporation on a given surface and retain moisture for a long time. Preferably, said wetting agent is selected from: glycols, glycerin and their derivatives and the like.

According to a further preferred embodiment of the invention, the composition further comprises microorganisms, preferably bacteria, more preferably PGPR (Plant Growth-Promoting Rhizobacteria) or PGRs, yeasts, fungi, mycorrhizae.

According to a further preferred embodiment of the invention, the composition further comprises fertilizers, or pesticides preferably fungicides, insecticides, nematicides, nematostatic agents, or herbicides.

According to a further preferred embodiment of the invention, the composition further comprises drying agents used in the agricultural industry.

According to a preferred embodiment, the composition is formulated as: solution, suspension, water-soluble concentrates, dispersable concentrates, emulsifiable concentrates, emulsions, suspensions, microemulsion, gel, microcapsules, granules, ultralow volume liquid, wetting powder, dustable powder, seed coating formulations, spray and ready to use formulations.

According to a preferred embodiment, the composition, preferably in any of the formulation disclosed above, is applied to the soil and/or to the leaves, preferably after being diluted with water.

The composition is preferably applied once or may be applied multiple times throughout the plant cycle, preferably the crop cycle.

Preferably, the composition is applied by using a fertigation system.

Preferably, the composition is applied when the plant to be treated is in conditions of sub-optimal water availability as defined above, preferably in the area occupied by plant roots and/or sprayed on to the leaves.

In this regard, it is advisable to monitor the soil water content preferably by using soil tensiometers or any further instruments useful for the scope.

Physiological plant responses to soil water content are closely correlated to: the kind of plants/crops, the phenological stage, the type of soil, environmental parameters and agricultural practices.

Indeed, it is advisable that the soil water content remains within certain limit that are considered compatible with plant growth, possibly avoiding critical values of soil water content corresponding to drought stress for plants.

EXAMPLE

Examples of Composition

Several compositions fitting the present invention were tested.

Some contained both plant derived material and algal extracts. Further compositions comprise only plant extract(s)/plant derived materials or algal extract(s). Algae means either macroalgae or microalgae.

Seaweed has been used as example of macroalgae, in particular *A. nodosum* and *Kappaphycus* SAP.

Several plant extracts (plant derivatives) have been used, such as several types of sugar beet derivatives, corn derivatives, and sugar cane.

Some tested compositions comprise also: N and/or K and/or Mn and/or Zn sources; and/or vitamins; and/or chelates; and/or preservatives; and/or surfactants in small amounts.

In particular, the following compositions have been tested:

TABLE I

| | Composition 1 | Composition 2 | Composition 3 | Composition 4 | Composition 5 |
|---|---|---|---|---|---|
| Plant extract/plant derived materials | 45 | 33.1 | 10 | 45 | 40 |
| Algae extract | 30 | 27.5 | 58.1 | 3.5 | 5 |

Composition 1 comprises also 21.9% w/w of N—K—Mn—Zn source and 0.6% w/w of Vitamins.

Plant extract/plant derived materials and algae extract are mixed together at 25° C., and, under stirring conditions, vitamins and N, K, Mn and Zn sources are added. Stirring conditions are maintained for additional 1 hour, and then the composition is considered ready to be used.

Genomic Investigation of an Example of the Composition of the Invention

The purpose of this experiment is to understand—through the microarray approach—the molecular network modulated by the compositions of the invention by using *Arabidopsis thaliana* plants as models.

This approach is widely used, even in agriculture, to understand the effects of molecules/compositions/raw materials of interest at transcriptomic level and consequently to hypothesize possible modes of action.

In this context, in particular, *Arabidopsis thaliana* seeds were sterilized for 7 minutes in 1.7% (v/v) bleach solution, rinsed 6 times in excess sterile water and transferred into 2.5 ml liquid growing media (MS half-strength solution) in six-well plates. The plates were incubated in the dark at 4° C. for 2 days and finally transferred to continuous light (90 µm photons m-2) with gentle swirling for 4 days in a plant growth chamber at 22° C. Treatments were performed by adding the composition of the invention disclosed above formulated as solution/suspension at rate 1 ml/L to the wells. Water has been added to the control wells. Control and treated samples used for the microarray experiment were collected after 24 hours from the treatment.

The RNA from collected samples was extracted using RNeasy Plant Mini Kit (Qiagen). Subsequently, DNase treatment was performed (Agilent, Santa Clara), according to the manufacturer's instruction. RNA quality, concentration and purity were assessed using a NanoChip 2100 BioAnalyzer (Agilent).

Hybridization, washing, staining, and scanning procedures were carried out according to the Agilent technical manual. The microarray analysis was performed using *Arabidopsis thaliana* gene expression microarray 4×44 K (Agilent), using a two-color Microarray-Based Gene Expression Analysis (Quick Amp Labeling). Subsequently, the raw gene expression data were extracted using the Agilent Feature Extraction software (version 12.0), followed by data analysis through the software GeneSpring GX (Agilent). The differentially expressed genes (DEG, adjusted P value 0.01) were filtered by selecting genes showing a fold change ≥5 between treatment and control.

Microarray results show that the compositions of the invention have a consistent effect on the transcriptome of *A. thaliana*, indeed it induces 359 genes and represses 339 transcripts. Looking at the role of the differentially expressed genes and focusing on the up-regulated ones, the following main processes have been identified modulated by the tested compositions:

1) Root development: As reported in FIG. 1 the tested compositions modulate several genes involved in specific biological processes directly involved in root development, such as root hair development, root elongation, differentiation, and morphogenesis.

2) Photosynthesis: in particular genes belonging to the GO groups GO:0015979 (photosynthesis), GO:0009765 (photosynthesis, light harvesting), GO:0009522 (photosystem 1), GO:0009523 (photosystem 2), GO:0009535 (chloroplast thylakoid membrane), GO:0016168 (chlorophyll binding). Moreover, genes involved in geranylgeranyl diphosphate (GGPP) biosynthetic process (GO:0033386).

3) Dehydrins and Early Responsive to Dehydration genes (ERD) genes (GO:0009414; GO:0009415)—these genes increase water binding capacity, provide stability to other proteins and macromolecules, and drive rapid change in the activity of cells depending on the presence, absence, and concentration of water.

To sum up, the transcriptomic investigation on *A. thaliana* plant models reveals the ability of the tested compositions to modulate genes involved in the processes listed above that are strictly connected—directly or indirectly—with an improvement in plant water use efficiency.

Phenomic Investigation of an Example of the Composition of the Invention

The purpose of this experiment is to understand at phenomic level—by using digital image analysis—the effect of the tested compositions directly on crops.

The phenomic approach permits the study of plant physiology and the effect of the compositions on the growth, performance, and water content of the tested plants based on multi-spectrum, high-throughput image analysis to detect morphometric and physiological parameters. Such multi-spectrum analysis (infrared, visible, and ultraviolet light) of reflected or re-emitted light from the plant crown, stem and leaves provides information on the nutritional, hydrological and physio-pathological state of plants, as well as on a plant's ability to absorb light. Being a high-throughput approach, this experiment has been set up to assay several crops in different climate conditions with the different compositions.

Here the results referred to two examples of relevant economic crops are reported, namely tomatoes and grapes. As mentioned above, several further crops have been tested in field, in particular: corn, soybean, fresh tomato, processing tomato, pepper, potato, onion, grapes, olive, and stone fruits.

In this context, the experiments were conducted in greenhouse conditions at the Plant Phenomics Platform (LemnaTec-Scanalyzer 3D system), ALSIA-Metapontum Agrobios Research Center, Southern Italy.

The tested compositions have been applied during pre-flowering phase on tomato plants (cv. Ikram) grown in 16 cm diameter-1.5 L pots. The protocol of the phenomic test performed at the Phenomic Platform (Alsia Research Center) is described in Table II.

TABLE II

| THESIS | RATE | TIMING | N° OF APPLICATIONS |
|---|---|---|---|
| UTC (100% water) | | | |
| UTC (70% water) | | | |
| Tested compositions (70% water) | 20 L/ha | 7-10 days | 3 |

UTC (100% water) identifies the Untreated Control where plants were irrigated according to the standard protocol. UTC (70% water) identifies the Untreated Control where plants were irrigated with a reduced water volume, corresponding to 70% compared to the fully watered UTC (100% water). Tested compositions (70% water) identifies the experimental condition where tomato plants were treated with the tested compositions reported above (3 applications at a rate of 20 L/ha. Timing: one application every 7-10 days) and irrigated with a water volume of 70% compared to the fully watered UTC (100% water) thesis. In particular, in this case the results refer to Compositions 1 and 3.

The same protocol was applied on grape plants during the vegetative phase, although in this case the tested compositions was applied at 10 L/ha, also to verify its efficacy at low dosages.

Phenomic analyses were performed using the LemnaTec-Scanalyzer 3D System. The analysis was carried out by using visible light (RGB) for Digital Biovolume and Green Index calculation, Near-infrared to measure the "Humid index", and UV (Ultraviolet) light to evaluate stress index.

The results of imaging analyses indicated that application of the tested composition exerted a consistent effect on the plant phenome.

In particular, the following results were observed:

1) Increase in Green Index—Increase in Green Index is generally linked to an improved photosynthetic activity (Thomas and Smart 1993), and consequent further benefits on biomass accumulation. It is worth remembering that this observation is in line with the photosynthetic gene's expression activation previously disclosed. During the experiment the images of plants were captured under visible light illumination from three orthogonal point of view, the angles were from above and two from the side (0° and 90°). The resulting images were then analyzed by categorizing the pixels according to their color. The color classes represent different the following plant health conditions: dark green as very healthy tissue, green as normal healthy tissue, yellow as chlorotic tissue and brown as necrotic tissue. The image acquired with RGB sensor was converted in the HSI and then the hue histogram was calculated. The relative greener area (GGA) of each image was calculated as the sum of frequencies of the histogram classes included in the hue range from yellowish green to bluish green (hue angle ranging from 80° to 180°—according to Casadesbs et al. 2007).

2) Increase in Digital Biovolume and related Leaf Area/Fresh weight—Eberius and Lima-Guerra in 2009 have proposed the following formula to estimate the plant biovolume by imaging analysis techniques:

Σ-pixel sideview 0°+Σpixel sideview 90°+log 10(Σpixel topview/3)

Deriving the plant pixel area from all side (in this case two side views images, 0° and 90°) and top view images, these pixels data were used to estimate the biovolume of the plant and reported as generic "k units".

Figure 3:
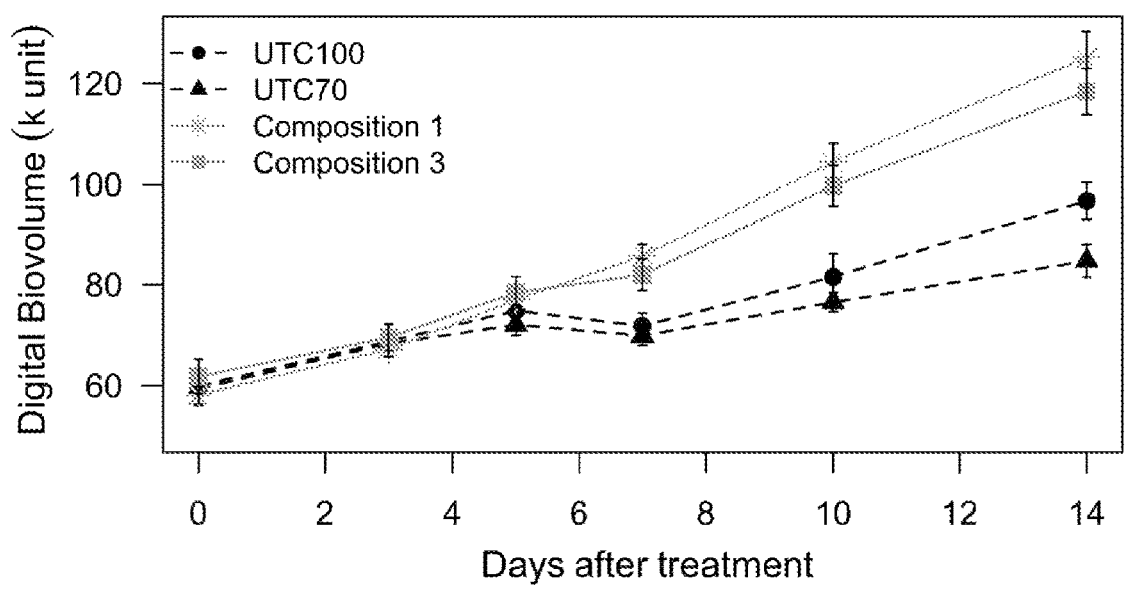
Figure 3:
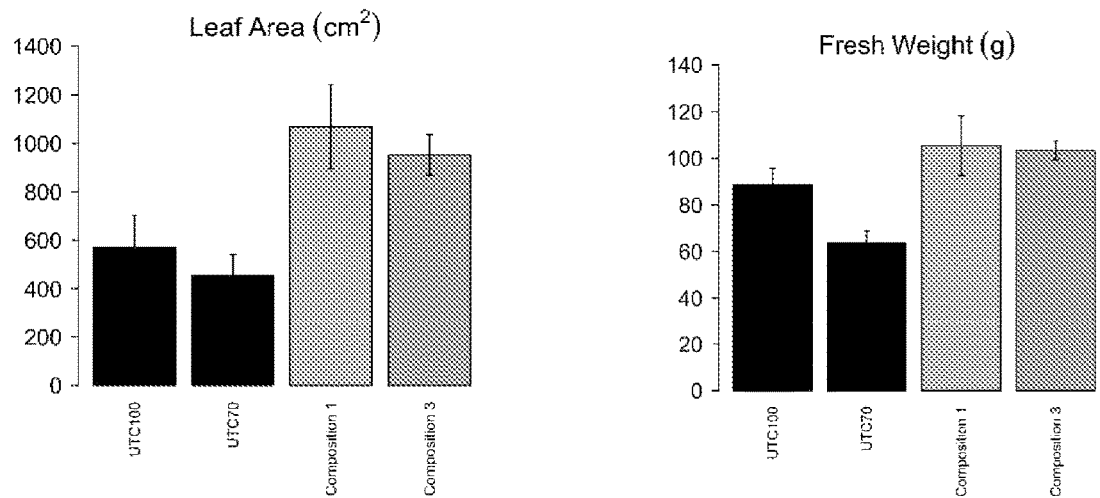

The results show that the tested compositions increase digital biovolume, especially from 5 days after treatment (FIG. 3A). In particular, in this case the results reported in FIG. 3-7 refer to compositions 1 and 3 provided as best examples.

At the end of the experiment, leaf area (cm2) was also measured and tomato plants were collected in order to assess the fresh weight (g). These analyses confirmed what was observed using phenomics, highlighting the positive effect of the application of the tested compositions (FIG. 3B).

3) Increase in Humid Index (water content)—In line with the molecular observations, the humid index—that means water content of tomato plants—was higher in plants treated with the tested compositions starting from 5 days after treatment (FIG. 4). The pixels from the grey-scale images generated in the NIR chamber were divided into equidistant classes according to their intensity. The group levels indicate the absorbance of NIR light, which is directly related to the quantity of water in the plant tissue. In this experiment, only values from 105 to 255 were considered and divided into 10 classes. The high-water content index was calculated by adding the relative area for the first three classes, those of the highest water content, and is reported as a fraction of the total area.

To sum up the phenomic investigation results on selective agronomic assessments (leaf area and fresh weight) on tomato plants revealed the ability of the tested compositions to increase the following parameters:

i) The "Green Index" strictly connected to an improvement in photosynthesis and in line with previous molecular indication on photosynthetic genes;
ii) The plant biovolume/biomass, and
iii) The "Humid Index", very important parameter for the evaluation of the water use efficiency and in line with the induction of dehydrins and ERD genes previously described.

Additional Physiological Parameters

Stomatal Conductance Balance Under Water Reduction Condition

Specific physiological analyses were performed on tomato and grape plants, considering the rates of 10 and 20 L/ha (tomato) and 10 L/ha (grape).

The first objective was to prove that the tested compositions were applied under non-stressing conditions, in particular non-drought condition. In this way, an eventual positive effect observed can be attributable to an improved water use efficiency, rather than an improved tolerance to drought. It is known that drought stress takes place below stomatal conductance value of 0.15 mol $H_2O$ $m^{-2}$ $s^{-1}$. Interestingly, in the tests herewith the conditions were always above this value proving that the tests were performed under non-stressing/non-drought condition.

The tested compositions were used at 10 and 20 L/ha in tomato, and 10 L/ha in grape.

The effect composition application to tomatoes was an increased/balanced stomatal conductance in comparison with UTC 70% during the first 4 days from the application (FIG. 5A). The balance of stomatal conductance has been confirmed also in grape for 20 days and using the tested compositions during the cycle (FIG. 5B; the arrows identify the days of composition application).

Increase in Photosynthesis

Very interestingly, the balanced stomata closure induced by the tested composition was associated with an increased photosynthetic level in both tomato and grape, in comparison with UTC 70% during the first week from the application. This is again in line with molecular and phenomic studies and explains the increase in biomass observed after the application of the formulation (FIGS. 6A and B).

Improved Water Productivity (Biovolume/H2O Utilized)

By dividing the measured digital biovolume by the water utilized, it was demonstrated that—starting from 5 days after treatment—the composition was clearly effective in improving water productivity (FIG. 7).

Field Trials

Sweet Orange

General Information and Experimental Design

The field trial was performed on sweet orange trees (*Citrus Sinensis*) cultivar Lanelate in Terpsithea (Greece), in the prefecture of Messinia, a region particularly dedicated to the orange crop, in a farm representative of the area in terms of cultivars and cultivation practice. The orchard was planted in 2011 with a planting density of 555 plants/ha, with rows spaced 6 meters and plants spaced 3 meters in the row. The orchard is irrigated via drip line with drippers placed close to the plants. The experimental design was an RCB (Randomized Complete Block) with four replicates; plot dimension was 6 m×12 m, including four trees each plot. In this trial, the water amount supplied at each irrigation turn in the "UTC 100%" area was calculated by the evaporimeter that measures ET0 (reference evapotranspiration). The final water volume was ETp=ET0×Kc, where Kc is crop coefficient (0-1 according to phenological stage).

In the water reduced plots, was applied a reduction of 31.6% on average of the irrigation water volume, calculated taking as a reference the ETp at each irrigation turn.

During the entire trial, soil tensiometers have been used in order to continuously monitor the soil water content and to ensure that in the reduced water plots it never reached values (KPa) considered critical for the crop (wilting point—drought condition).

For thesis 3 and 4 of Table IV, the composition was applied 4 times via drip irrigation system during the most sensitive period to water stress of the crop cycle (from July to September).

The claimed composition was applied at the dosage of 5 and 10 L/ha for samples 3 and 4 respectively, dissolved in a water volume equal to approximately 10.000 L/ha each application.

The overall weather conditions that occurred throughout the course of the trial were below normal for the period regarding rainfall and air humidity, coupled with higher than usual air temperature.

At harvest time, yield was measured per each plant individually.

Data were analyzed using ANOVA techniques. Where this implied statistically significant differences, this was followed by Student-Newman-Keuls test, for significant difference at the 95% confidence level. Where two means share the same alphabetical notation, they are not significantly different.

Irrigation Management in the Field Trial

Using an evaporimeter was calculated the water lost in the orchard due to the evapotraspiration process, thus including both water evaporated from soil and water lost by the crop by plant transpiration, according to the formula ETp=ET0× Kc (where ETp is the Potential Evapotraspiration, ET0 is the value returned by the evaporimeter and Kc is a crop coefficient).

During the crop cycle were executed five irrigation turns. At each turn, the amount of irrigation water supplied to the crop corresponded to the ETp in sample 1, balancing the full amount of water lost due to evapotranspiration process, and to approximately the 70% of the ETp in the other thesis—thus inducing an irrigation water reduction of about −30%—as per Table III.

TABLE III

Details of irrigation water management in the trial.

| Irrigation regime | Amount | Reduction | Evapo-transpiration | Month | L/plant |
|---|---|---|---|---|---|
| 100% evapot. | 5 mm | 0 | 4.97 mm | June | 90 |
| Reduced | 3.5 mm | −30% | | | 63 |
| 100% evapot. | 11 mm | 0 | 10.82 mm | July | 198 |
| Reduced | 7 mm | −36.3% | | | 126 |
| 100% evapot. | 11.5 mm | 0 | 11.27 mm | August | 207 |
| Reduced | 8 mm | −30.4% | | | 144 |
| 100% evapot. | 7.5 mm | 0 | 7.16 mm | September | 135 |
| Reduced | 5.5 mm | −33.3% | | | 99 |
| 100% evapot. | 7 mm | 0 | 7.05 mm | October | 126 |
| Reduced | 5 mm | −28.5% | | | 90 |
| Tot in 100% irrig. | 42 mm | 0 | 41.27 mm | June-October | 756 |
| Tot in Water Red. | 29 mm | −30.9% | | | 522 |

During the entire crop cycle, soil tensiometers with datalogger capacity have been placed in thesis 1 and 2 in order to keep continuously monitored the soil water content, ensuring that in the reduced water plots it never reached values (KPa) considered critical for the crop (so high to reach wilting point/drought condition). Values of about −60 kPa of soil water potential were considered the limit before plants start feeling drought stress.

Table IV below summarizes the yield results and shows the amount of irrigation water supplied to the crop and the ratio between yield and irrigation water supplied

TABLE IV

| Thesis | Treatment | Rate | Appl. Nr. | Yield per plant (g) | Amount of water/plant (L) | Stat. | WP |
|---|---|---|---|---|---|---|---|
| 1 | UTC 100% | — | — | 52778.1 | 756 | b | 69.81 |
| 2 | UTC (water reduced) | — | — | 39391.9 | 522 | d | 75.46 |
| 3 | Tested composition | 5 L/ha | 4 | 43208.1 | | c | 82.77 |
| 4 | Tested composition | 10 L/ha | 4 | 60648.8 | | a | 116.19 |

The data show that, at harvest time, yield expressed as grams per tree in the plots of thesis 2 (UTC, Water reduced) was lower than thesis 1 (UTC "fully watered") and the lowest in the experiment.

Plots treated with the tested composition showed a significant yield increase comparing with thesis 2 at both rates, showing the effect of the tested composition in improving crop yield in reduced water supply conditions. In particular, thesis 4 (tested composition at highest rate) showed an even higher yield than the fully watered UTC. Yield results statistically differ each other.

Greenhouse Sweet Pepper

General Information and Experimental Design.

The field trial was performed on sweet pepper (*Capsicum annuum*) cultivar 1024RZ grown under plastic greenhouse in Vicar (Almeria, Spain). The crop management and growing system of the farm that hosted the trial are in line with common agricultural practice of the area.

Plants were spaced 1 m between rows and 0.5 m in the row, with a planting density of 20.000 plants/ha. The experimental design was an RCB (Randomized Complete Block) with four replicates, plot size was as big to include four plants each plot.

A commercial product for this purpose, namely Integrate® was included in the trial protocol as reference due the claimed effect on water and nutrient management.

The tested composition was applied four times during the crop cycle at the dosage of 5 and 10 L/ha for thesis 3 and 4 respectively using an injector linked to a motor pump, dissolved in a water volume equal to approximately 10.000 L/ha each application. The trial lasted for approximately three months, and at harvest time yield was measured per each plot separately. Data were analysed using ANOVA techniques within the software Statistica. Where this implied statistically significant differences, this was followed by Fisher LSD test, for significant difference at the 95% confidence level. Where two means share the same alphabetical notation, they are not significantly different.

Irrigation Management in the Field Trial

In order to test the performance of the tested composition when applied in conditions of optimized irrigation water supply (avoiding excess of water as well too low water volume supply to the crop), a separated fertigation system was set up in the area interested by the experiment, that permitted an irrigation management independent from the farmer, keeping anyhow the same nutritional input level as the rest of the field.

During the entire trial soil tensiometers have been used to continuously monitor the soil water content, ensuring that in the optimized water supply plots (thesis 2 to 5) the soil water potential always remained within the range of generally acceptable values for the crop (−10/−20 kPa) avoiding to reach critical values.

Thesis 1 (untreated) received the same amount of irrigation water as the farm standard and was monitored as well with soil tensiometer.

Table V below summarize the yield results and shows the amount of irrigation water supplied to the crop.

TABLE V

| thesis | Treatment | Rate | Appl. Nr. | Yield (g/m2) | Amount of water (liter/m2) | Stat. | WP |
|---|---|---|---|---|---|---|---|
| 1 | UTC 100% | — | — | 4050 | 83.3 | ab | 48.61 |
| 2 | UTC (water reduced) | — | — | 3480 | 77.2 | b | 45.06 |
| 3 | Tested composition | 5 L/ha | 4 | 4460 | | a | 57.65 |
| 4 | Tested composition | 10 L/ha | 4 | 4660 | | a | 60.43 |
| 5 | Integrate TM | 2-1 L/ha | 2 | 4060 | | ab | 52.57 |

The product used as comparison is INTEGRATE 20, which is an agricultural soil surfactant. At the end of the trial it has been found that the farm standard was receiving approximately a +7% of irrigation water volume compared to the "optimized water" plots. This caused a drop-in yield in the UTC water reduced compared with the fully watered UTC (from 4050 to 3480 grams/m2). On the other hand, in the two theses were tested composition was used higher yield than UTC was recorded (4460 and 4660 grams/m2 for the tested composition at 5 and 10 L/ha respectively), reaching values even higher than the fully watered UTC.

The commercial product was able to increase yield but at a lower level than the tested composition (4060 qrams/m2).

Greenhouse Tomato

General Information and Experimental Design

The field trial was realized on fresh tomato (*Solanum Lycopersicum*) cultivar Creativo grown under plastic greenhouse in Santa Croce Camerina (Ragusa, Italy). The crop management and growing system of the farm that hosted the trial are in line with most common agricultural practice.

Plants were spaced one meter between rows and 0.33 m in the row, with a planting density of 30.300 plants/ha. The experimental design was an RCB (Randomized Complete Block) with four replicates, plot size was as big to include six plants each plot. Three different commercial products—Integrate, H2Flo and Transformer—were included in the trial protocol as references.

The tested compositions were applied four times during fruit formation phase of the crop cycle. Except for the first application date where all samples were treated, commercial products were applied at the timing suggested by the producer in the official technical sheet, thus not in all cases coinciding with application dates of the tested compositions.

The tested compositions were applied at the dosage of 5 and 10 L/ha for samples 3 and 4 respectively using an injector linked to a motor pump, dissolved in a water volume equal to approximately 10.000 L/ha each application. The trial lasted for approximately two months, and at harvest time yield was measured per each plot separately. Data were analyzed using ANOVA techniques within the software Statistica and when statistically significant differences were found Fisher LSD test follows for significant difference at the 95% confidence level. When two means share the same alphabetical notation means that they are not significantly different.

Irrigation Management in the Field Trial

In order to test the performance of the tested compositions when applied in conditions of reduced irrigation water supply, the farm irrigation system was modified in the area interested by the experiment by reducing the water volume of 25% compared to the farm irrigation management in thesis 2-7. The same fertilizer input level as the rest of the field was ensured to the water reduced plots.

During the entire trial soil tensiometers have been used to continuously monitor the soil water content, ensuring that in the water reduced plots (thesis 2 to 5) the soil water potential never reached critical values for the crop (that is generally lower than −20 kPa). In order to measuring the amount of irrigation water supplied to the crop, water flow meters were installed in reference plot in thesis 1 and 2, and the value of L/m2 was then calculated (as reported in Table VI).

Thesis 1 (untreated) received the same amount of irrigation water as the farm standard and was monitored as well with soil tensiometer and water flowmeter.

Table VI summarizes the yield results and it shows the amount of irrigation water supplied to the crop.

| Thesis | Treatment | Rate | Appl. Nr. | Yield (g/m2) | Amount of water (liter/m2) | Stat. | WP |
|---|---|---|---|---|---|---|---|
| 1 | UTC 100% | — | — | 6690 | 56.3 | a | 118.8 |
| 2 | UTC (water reduced) | — | — | 5770 | | b | 136.7 |
| 3 | Tested composition | 5 L/ha | 4 | 6440 | | ab | 152.6 |
| 4 | Tested composition | 10 L/ha | 4 | 6550 | | a | 155.2 |
| 5 | Integrate | 2-1 L/ha | 2 | 6280 | 42.2 | ab | 148.8 |
| 6 | H2Flo | 2-1 L/ha | 2 | 5999 | | ab | 142.2 |
| 7 | Transformer | 9.5 L/ha | 4 | 6220 | | ab | 147.4 |

At the end of the trial it has been found that the water reduced plots received a −25% of irrigation water volume compared to the thesis 1 (42,2 L/m2 against 56,3 L/m2). This caused a drop in yield in the UTC water reduced compared with the fully watered UTC (from 6690 to 5770 grams/m2).

In both thesis the tested compositions used a higher yield than UTC was recorded (6440 and 6550 qrams/m2 for the tested compositions at 5 and 10 L/ha respectively), showing a relevant efficacy in increasing crop yield of the composition.

The three commercial products tested were also able to increase yield but all of them at a lower level than the tested compositions (6280, 5999 and 6220 grams/m2 respectively).

The invention claimed is:

1. A method for improving water use efficiency and/or water productivity in plants and/or agricultural water management, comprising the step of feeding plants an effective amount of a composition comprising at least one algal extract and at least one plant extract, wherein the feeding step occurs by administering the composition through the soil, and wherein said plants are in a non-drought condition, wherein the non-drought condition corresponds:
   1) to a value of leaf stomatal conductance level above 0.15 mol H2O m$^{-2}$s$^{-1}$, as measured through porometer Licor gas-exchange system,
   and/or to a value of soil water content ranging from −10 kPa to −60 kPa, wherein said soil water content is measured by using tensiometers wherein the composition increases plants at least one of Green Index, Digital biovolume, Humid Index, Stomatal Conductance and yield in comparison to plants being fully watered (100% watered) or 70% watered (reduced watered) untreated with the extracts.

2. The method according to claim 1, wherein the at least one plant extract is present in the composition at a concentration up to 60%, said concentration being w/w.

3. The method according to claim 2, wherein said concentration ranges from 30% to 45%.

4. The method according to claim 1, wherein the at least one algal extract is present in the composition at a concentration up to 60%, said concentration being w/w.

5. The method according to claim 4, wherein said concentration ranges from 20% to 45%.

6. The method according to claim 1, wherein the composition comprises at least one algal extract at a concentration up to 40% w/w, and at least one plant extract in a concentration up to 60% w/w.

7. The method according to claim 6, wherein the algal extract is present in a concentration at up to 30%, and the plant extract is present in a concentration ranges from 45% to 50%.

8. The method according to claim 1, wherein said algal extract comprises macroalgae and/or microalgae.

9. The method according to claim 8, wherein said macroalgae is red, brown or green seaweed.

10. The method according to claim 1, wherein said plant extract is a plant-derived material, wherein the plant of the plant-derived material is selected from the group consisting of beet, sugar cane, alfalfa, maize, brassica, halophytes, soya, wheat, yucca, quillaja, hop, coffee, citrus, olive, lupine, bean, pea, lentils, mushrooms, carrot, apple, tomato and combinations thereof.

11. The method according to claim 1, wherein said plant is a monocotyledonous or dicotyledonous species selected from fertigated orchards, vegetable species, and row/industrial crops.

12. The method according to claim 1, wherein the composition further comprises: a source of macro-micronutrients in a concentration ranging from 1% to 30%, wherein said source of macro-micronutrients is selected from the group consisting of a nitrogen source, a potassium source, a manganese source, a zinc source, an iron source, a copper source and combinations thereof; and/or at least one metabolism stimulating substances, in a concentration ranging from 0.1% to 1%; and/or a plant biostimulant (PBS); and/or microorganisms selected from the group consisting of bacteria, PGPR (Plant Growth-Promoting Rhizobacteria), yeasts, fungi, and mycorrhizae, and/or an agricultural compatible carrier; and/or a herbicide, nematicide agent, nematostatic agent, fungicide, and/or insecticide; and/or a drying agent.

13. The method according to claim 1, wherein the composition is formulated as a solution, suspension, water-soluble concentrates, dispersable concentrates, emulsifiable concentrates, emulsions, suspensions, microemulsion, gel, microcapsules, granules, ultralow volume liquid, wetting powder, dustable powder, seed coating, spray, or ready-to-use formulation.

14. The method according to claim 1, wherein the composition is fed to the plants, after being diluted in water, once or repeatedly throughout the plant cycle, wherein the feeding step is performed through the soil and/or through the leaves.

15. The method according to claim 1, further comprising a step of monitoring the soil water content value and/or the leaf stomatal conductance value, said step of monitoring being performed before and after the feeding step.

16. The method according to claim 1, wherein the feeding step is performed when the water soil content and/or availability holds in an optimal or sub-optimal value for a crop development, and/or in a condition of limited irrigation water availability, as long as drought condition is not reached.

17. The method according to claim 1, wherein the plant extract or algal extract is prepared by using a process comprising: (i) providing a sample of algae and/or a sample of plants; and (ii) contacting said sample(s) with an aqueous solution comprising an extraction agent.

* * * * *